(12) United States Patent
Ardanese et al.

(10) Patent No.: US 9,046,025 B2
(45) Date of Patent: Jun. 2, 2015

(54) SELECTIVE CATALYTIC REDUCTION DEVICE MONITORING SYSTEM

(71) Applicant: GM Global Technology Operations LLC, Detroit, MI (US)

(72) Inventors: Raffaello Ardanese, Troy, MI (US); Min Sun, Troy, MI (US); Justin Adam Shetney, Livonia, MI (US); Shouxian Ren, Ypsilanti, MI (US); Christopher P. Musienko, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 125 days.

(21) Appl. No.: 13/912,870

(22) Filed: Jun. 7, 2013

(65) Prior Publication Data

US 2014/0360165 A1  Dec. 11, 2014

(51) Int. Cl.
*F01N 11/00* (2006.01)
*F01N 3/20* (2006.01)
*F01N 3/08* (2006.01)

(52) U.S. Cl.
CPC ......... *F01N 11/00* (2013.01); *F01N 2900/1621* (2013.01); *F01N 2560/026* (2013.01); *F01N 3/208* (2013.01); *F01N 3/0842* (2013.01); *F01N 2610/02* (2013.01); *Y02T 10/47* (2013.01)

(58) Field of Classification Search
CPC ....... F01N 3/0842; F01N 3/208; F01N 11/00; F01N 2560/026; F01N 2610/02; F01N 2900/1621
USPC .................... 60/274, 276, 277, 286, 295, 301
See application file for complete search history.

(56) References Cited

U.S. PATENT DOCUMENTS

| | | | |
|---|---|---|---|
| 8,387,368 B2 | 3/2013 | Parmentier et al. | |
| 2010/0024397 A1 | 2/2010 | Chi et al. | |
| 2011/0203259 A1* | 8/2011 | Upadhyay et al. | 60/274 |
| 2012/0096837 A1* | 4/2012 | Yacoub | 60/274 |
| 2012/0210696 A1* | 8/2012 | Schmieg et al. | 60/274 |
| 2012/0310507 A1 | 12/2012 | Auckenthaler | |
| 2013/0255233 A1* | 10/2013 | Yasui | 60/286 |

\* cited by examiner

*Primary Examiner* — Thomas Denion
*Assistant Examiner* — Jorge Leon, Jr.
(74) *Attorney, Agent, or Firm* — Cantor Colburn LLP

(57) ABSTRACT

A selective catalytic reduction (SCR) device monitoring system includes an engine out NOx monitoring module, an SCR out NOx monitoring module configured and disposed to monitor NOx released from the SCR device, and a NOx storage model module operatively connected to the engine out NOx module and the SCR out NOx monitoring module. The NOx storage model module is configured and disposed to determine an amount of NOx stored in the SCR device. A consumed ammonia correction model module is operatively coupled to the NOx storage model module and configured and disposed to calculate a corrected consumed ammonia correction factor.

9 Claims, 3 Drawing Sheets

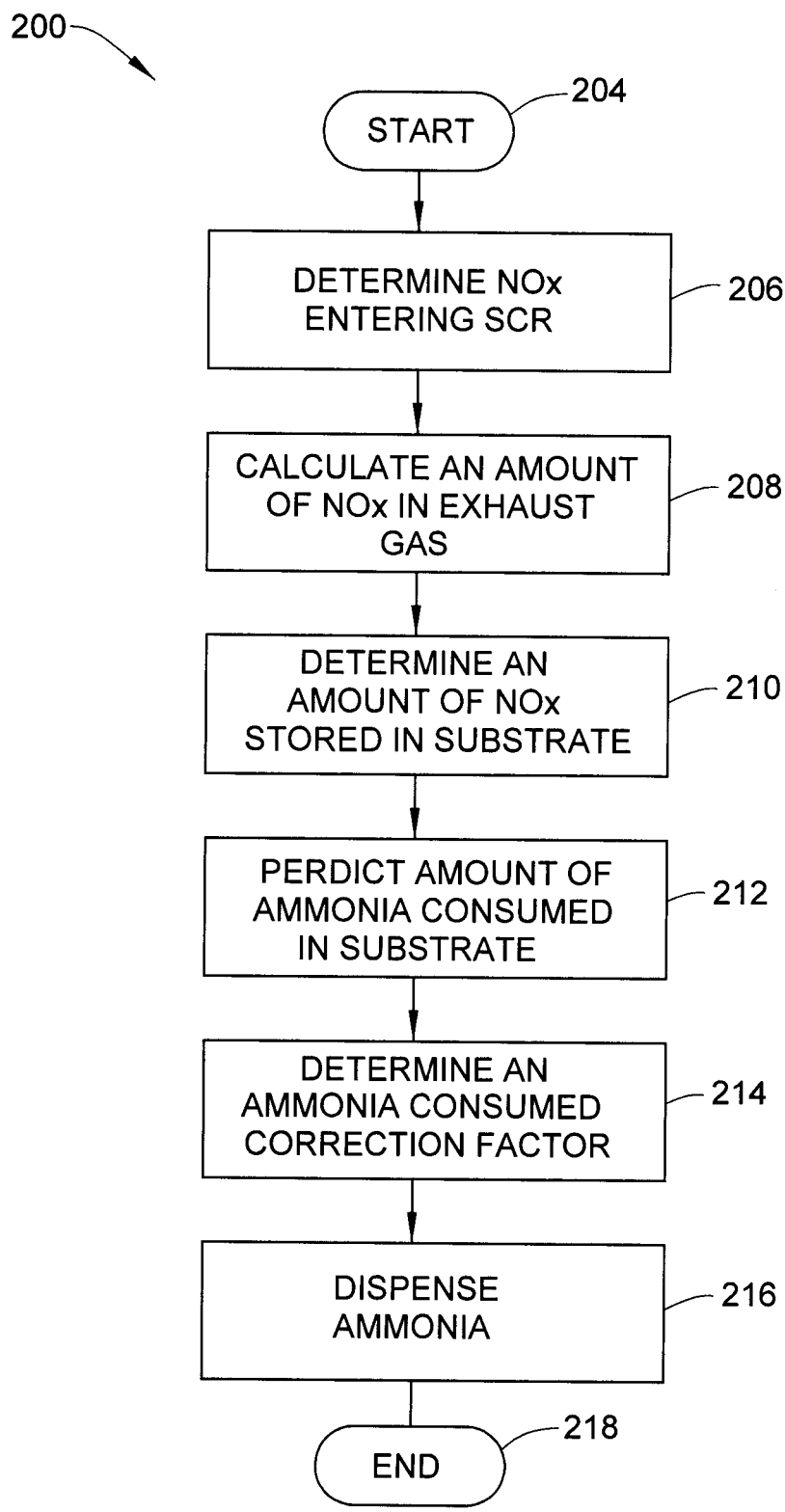

SELECTIVE CATALYTIC REDUCTION DEVICE MONITORING SYSTEM

FIELD OF THE INVENTION

The subject invention relates to the art of motor vehicles and, more particularly, to a selective catalytic reduction (SCR) monitoring system.

BACKGROUND

Exhaust gas emitted from an internal combustion engine, particularly a diesel engine, is a heterogeneous mixture that contains gaseous emissions such as, but not limited to, carbon monoxide ("CO"), unburned hydrocarbons ("HC") and oxides of nitrogen ("NOx") as well as condensed phase materials (liquids and solids) that constitute particulate matter ("PM"). Catalyst compositions, typically disposed on catalyst supports or substrates, are provided in an engine exhaust system as part of an aftertreatment system to convert certain, or all of these exhaust constituents into non-regulated exhaust gas components.

One type of exhaust aftertreatment technology for reducing emissions is a selective catalytic reduction (SCR) system. An SCR system converts nitrogen oxides (NOx) into diatomic nitrogen with the aid of a catalyst. Generally, SCR systems utilize a gaseous reductant typically in the form of ammonia. The ammonia is added to exhaust gases entering the SCR system and stored in the catalyst. Heat produced by the exhaust gases creates a chemical reaction between the ammonia in the catalyst and the exhaust gases causing NOx to be converted to diatomic nitrogen.

When a vehicle operates at idle, or in low exhaust temperature environments, amounts of NOx entering the SCR system may exceed amounts of $NO_x$ leaving the SCR system. In such cases, NOx may build up in the catalyst. When transitioning to normal operating temperatures, the amount of NOx leaving the SCR system may exceed the amount of NOx entering the SCR system due to NOx stored in the catalyst. During such periods, a prediction error will occur in an SCR control module which monitors SCR system efficiency. Accordingly, it is desirable to provide the SCR module with a NOx correction model to improve NOx conversion efficiency estimations.

SUMMARY OF THE INVENTION

In accordance with an exemplary embodiment, a selective catalytic reduction (SCR) device monitoring system includes an engine out NOx monitoring module, a SCR out NOx monitoring module configured and disposed to monitor NOx released from the SCR device, and a NOx storage model module operatively connected to the engine out NOx module and the SCR out NOx monitoring module. The NOx storage model module is configured and disposed to determine an amount of NOx stored in the SCR device. A consumed ammonia correction model module is operatively coupled to the NOx storage model module and configured and disposed to calculate a corrected consumed ammonia correction factor.

In accordance with another exemplary embodiment, an internal combustion engine includes an engine including an exhaust gas conduit, a selective catalytic reduction (SCR) device fluidically connected to the exhaust gas conduit, and a SCR device monitoring system. The SCR device monitoring system includes an engine out NOx monitoring module, an SCR out NOx monitoring module configured and disposed to monitor NOx released from the SCR device and a NOx storage model module operatively connected to the engine out NOx module and the SCR out NOx monitoring module. The NOx storage model module is configured and disposed to determine an amount of NOx stored in the SCR device. A consumed ammonia correction model module is operatively connected to the NOx storage model module. The consumed ammonia correction model module is configured and disposed to calculate a corrected consumed ammonia correction factor.

In accordance with yet another exemplary embodiment, a method of monitoring a selective catalytic reduction (SCR) device includes calculating an amount of NOx entrained within exhaust gases passing from an internal combustion engine, determining an amount of NOx entrained within exhaust gases passing from the SCR device, calculating an amount of NOx stored in the SCR device, calculating a corrected consumed ammonia correction factor, and determining a corrected amount of ammonia consumed in the SCR device.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 3 is a flowchart illustrating a method of monitoring a SCR device in accordance with an exemplary embodiment.

DESCRIPTION OF THE EMBODIMENTS

Figure 1:
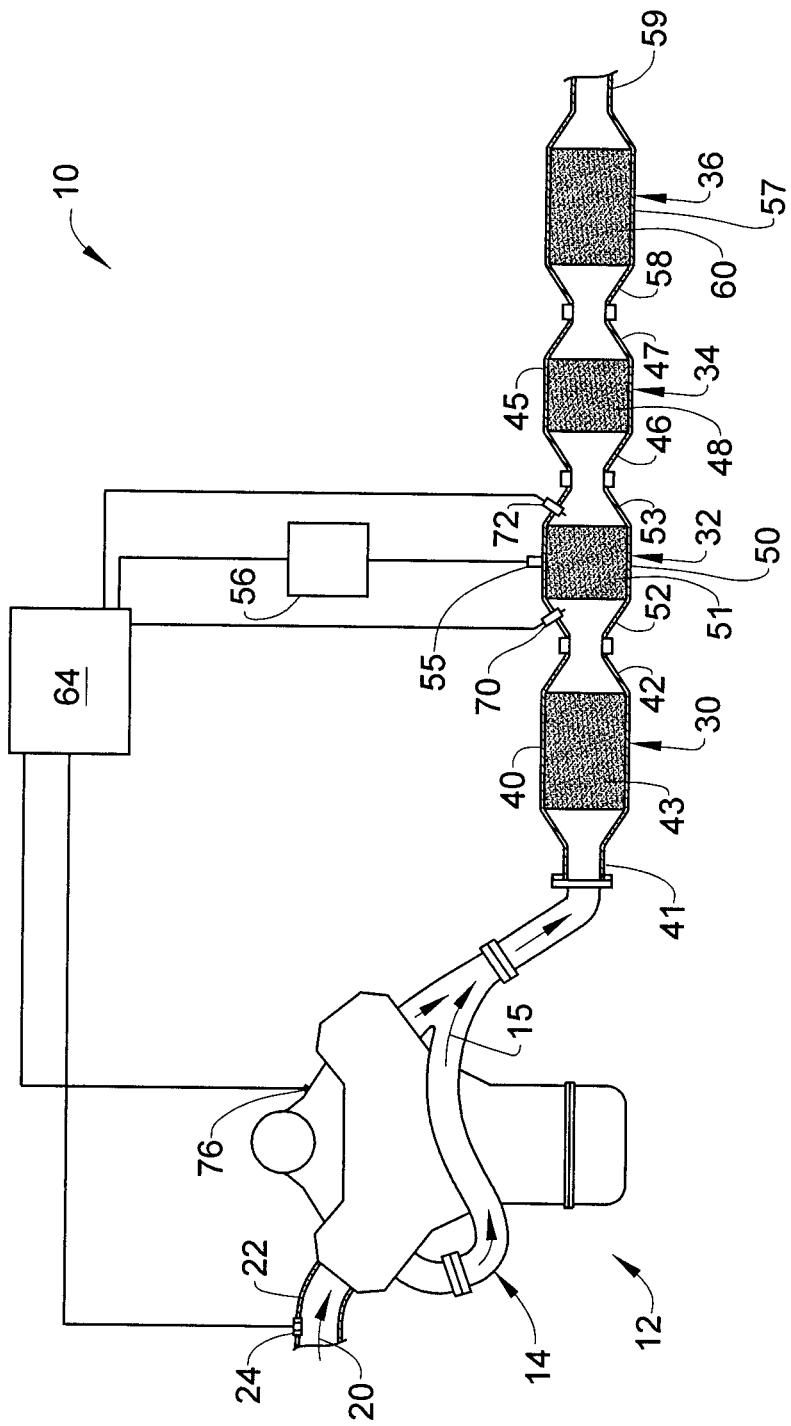
FIG. 1 is a schematic diagram of a selective catalytic reduction (SCR) monitoring system including a control module in accordance with exemplary embodiments

The following description is merely exemplary in nature and is not intended to limit the present disclosure, its application or uses. It should be understood that throughout the drawings, corresponding reference numerals indicate like or corresponding parts and features. As used herein, the term "module" refers to an application specific integrated circuit (ASIC), an electronic circuit, a processor (shared, dedicated, or group) and memory that executes one or more software or firmware programs, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

Referring now to FIG. 1, an exemplary embodiment is directed to a selective catalytic reduction (SCR) device monitoring system 10 for an internal combustion ("IC") engine 12. An exhaust gas conduit 14, which may comprise several segments, transports exhaust gas 15 from the engine 12 to various aftertreatment devices. More specifically, engine 12 is configured to receive an intake air 20 through an air intake passage 22. Air intake passage 22 includes an intake mass airflow sensor 24 for determining the intake air mass of the engine 12. In one embodiment, the intake mass airflow sensor 24 may be either a vane meter or a hot wire type intake mass airflow sensor; however, it is to be understood that other types of sensors may be used as well. Intake air 20 mixes with fuel (not shown) to form a combustible mixture. The combustible mixture is compressed to combustion pressure in a combustion chamber of engine 12 producing work, i.e., engine output and exhaust gases 15. Exhaust gases 15 pass from the engine 12 to various aftertreatment devices, as will be detailed more fully below.

In the exemplary embodiment as illustrated, aftertreatment devices of the selective catalytic reduction (SCR) device monitoring system 10 include a first oxidation catalyst ("OC") device 30, a selective catalytic reduction ("SCR") device 32, a second OC device 34, and a particulate filter ("PF") device 36. As can be appreciated, the SCR device monitoring system 10 of the present disclosure may include various combinations of one or more of the aftertreatment devices shown in FIG. 1, and/or other aftertreatment devices (e.g., lean NOx traps), and is not limited to the present example.

First OC device 30 includes a casing 40 having an inlet 41 in fluid communication with exhaust gas conduit 14 and an outlet 42. Casing 40 may surround a flow-through metal or ceramic monolith substrate 43. Similarly, second OC device 34 includes a casing 45 having an inlet 46 and an outlet 47. Casing 45 may surround a flow-through metal or ceramic monolith substrate 48. Flow-through metal or ceramic monolith substrates 43 and 48 can include an oxidation catalyst compound disposed thereon. The oxidation catalyst compound may be applied as a wash coat and may contain platinum group metals such as platinum ("Pt"), palladium ("Pd"), rhodium ("Rh") or other suitable oxidizing catalysts, or combinations thereof. The OC devices 30 and 34 are useful in treating unburned gaseous HC and CO, which are oxidized to form carbon dioxide and water.

SCR device 32 may be disposed downstream of first OC device 30 and upstream of second OC device 34. In a manner similar to the OC devices 30 and 34, SCR device 32 includes a shell or casing 50 that houses a flow-through metal or ceramic monolith substrate 51. Casing 50 includes an inlet 52 in fluid communication with outlet 42 of first OC device 30, and an outlet 53 in fluid communication with outlet 47 of second OC device 34. Substrate 51 may include an SCR catalyst composition applied thereto. The SCR catalyst composition may contain a zeolite and one or more base metal components such as iron ("Fe"), cobalt ("Co"), copper ("Cu") or vanadium ("V") which can operate efficiently to convert NOx constituents in the exhaust gas 15 in the presence of a reductant such as ammonia. In an embodiment, casing 50 also includes an ammonia inlet 55, which may also be upstream, fluidically coupled to an ammonia dosing system 56.

PF device 36 may be disposed downstream of SCR device 32 and second OC device 34. PF device 36 operates to filter exhaust gas 15 of carbon and other particulates (soot). PF device 36 includes a casing 57 having an inlet 58 fluidically coupled to outlet 47 of second OC device 34 and an outlet 59 that may discharge to ambient. Casing 57 may surround a ceramic wall flow monolith filter 60. Ceramic wall flow monolith filter 60 may have a plurality of longitudinally extending passages (not separately labeled) that are defined by longitudinally extending walls (also not separately labeled). The passages include a subset of inlet passages that have an open inlet end and a closed outlet end, and a subset of outlet passages that have a closed inlet end and an open outlet end. Exhaust gas 15 entering the filter 60 through the inlet ends of the inlet passages is forced to migrate through adjacent longitudinally extending walls to the outlet passages. It is through this wall flow mechanism that the exhaust gas 15 is filtered of carbon and other particulates. The filtered particulates are deposited on the longitudinally extending walls of the inlet passages and, over time, will have the effect of increasing exhaust gas backpressure experienced by the engine 12. It is appreciated that the ceramic wall flow monolith filter 60 is merely exemplary in nature and that the PF device 36 may include other filter devices such as wound or packed fiber filters, open cell foams, sintered metal fibers, etc. The increase in exhaust gas backpressure caused by the accumulation of particulate matter in the monolith filter 60 typically requires that the PF device 36 is periodically replaced, cleaned, or regenerated. Regeneration involves the oxidation or burning of the accumulated carbon and other particulates in what is typically a high temperature environment (>600° C.).

A control module 64 is operably connected to, and monitors, the engine 12 and the SCR device monitoring system 10 through a number of sensors. FIG. 1 illustrates the control module 64 in communication with the engine 12, intake mass airflow sensor 24, an engine out NOx sensor 70 mounted at inlet 52 of SCR device 32, an SCR out NOx sensor 72 mounted at outlet 53 of SCR device 32 and a tachometer 76 for determining engine speed and engine accelerations. Control module 64 determines, in part, an amount of NOx entering SCR device 32, an amount of NOx exiting SCR device 32 and an amount of NOx stored in substrate 51. More specifically, during low speed operation or idle, NOx entering SCR device 32 is greater than NOx passing from SCR device 32. A portion of the NOx that is stored in substrate 51 consumes stored ammonia when released.

In accordance with one exemplary aspect of the invention, control module 64 includes logic that monitors operating parameters of engine 12 including temperatures, accelerations, and NOx content in exhaust gases 15. Based on the monitored parameters, control module 64 calculates NOx accumulation in SCR device 32, and as will be detailed more fully below, an ammonia consumed correction factor to account for ammonia consumed by the stored NOx and provide ammonia introduction at a rate that ensures NOx conversion remains at desired levels.

Figure 2:
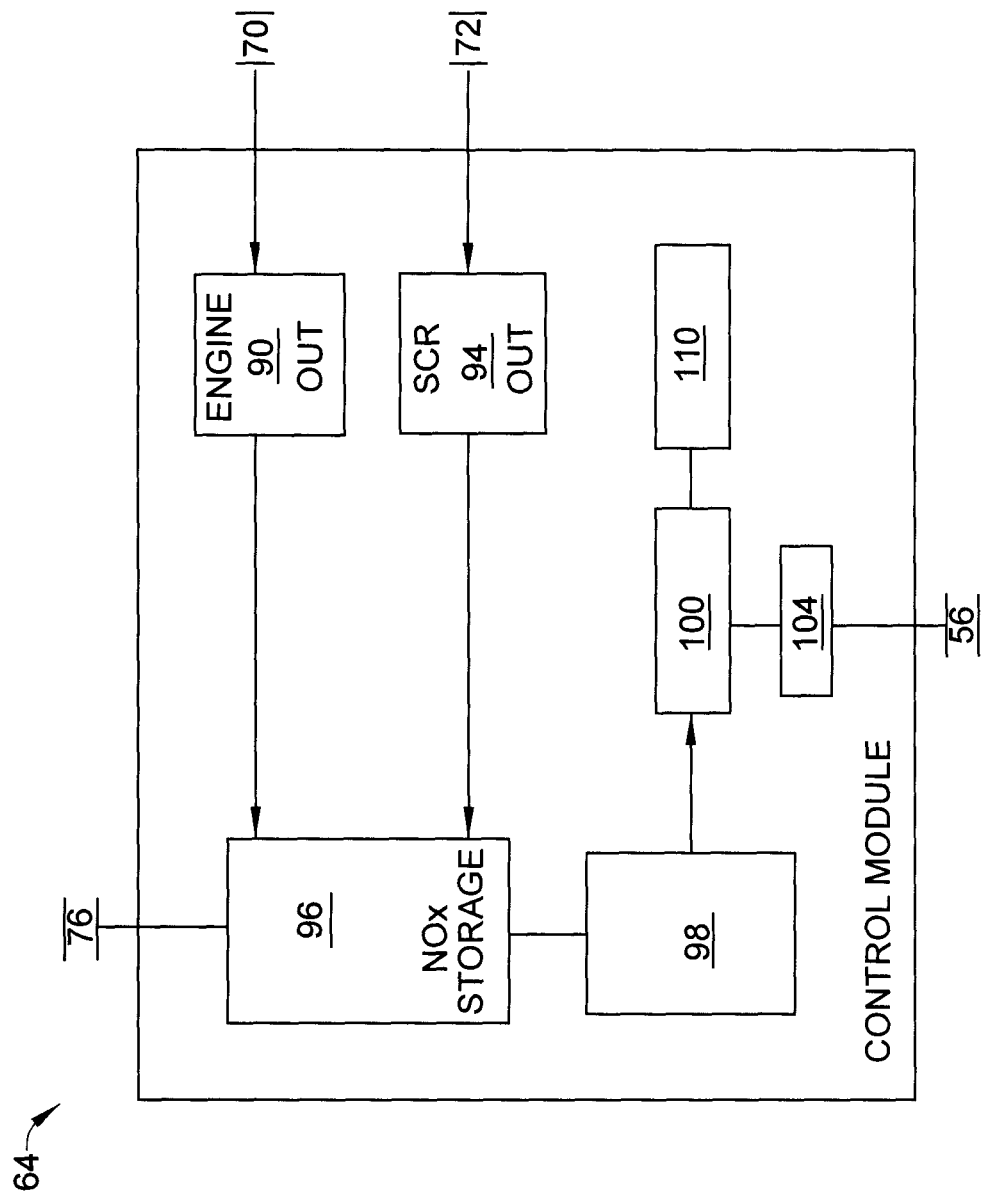
FIG. 2 is a dataflow diagram of the control module shown in FIG. 1 in accordance with exemplary embodiments.

FIG. 2 is an illustration of a dataflow diagram that illustrates various elements that may be embedded within the control module 64. Various embodiments of SCR device monitoring system 10 of FIG. 1, according to the present disclosure, may include any number of sub-modules embedded within the control module 64. As can be appreciated, the sub-modules shown in FIG. 2 may be combined or further partitioned as well. Inputs to control module 64 may be sensed from the SCR device monitoring system 10, received from other control modules (not shown), or determined by other sub-modules or modules. In the embodiment as shown in FIG. 2, control module 64 includes an engine out NOx monitoring module 90 operatively connected to engine out NOx sensor 70 and a SCR out NOx monitoring module 94 operatively connected to SCR out NOx sensor 72. Engine out NOx monitoring module 90 and SCR out NOx monitoring module 94 are operatively connected to a NOx storage model module 96. NOx storage model module 96 is also operatively connected to tachometer 76 and determines an amount of NOx that may have accumulated in substrate 51 during periods of low speed operation and/or idle.

In further accordance with the exemplary embodiment, control module 64 also includes a predicted consumed ammonia model module 98 that calculates a predicted amount of consumed ammonia based on the amount of NOx entering SCR device 32 and the amount of NOx exiting SCR device 32. Control module 64 further includes a consumed ammonia correction model module 100. Consumed ammonia correction model module 100 determines an ammonia consumed correction factor that accounts for ammonia consumed from substrate 51 after periods of low speed operation and/or idle. Consumed ammonia correction model module 100 is operatively connected to ammonia dosing system 56 through an ammonia dosing module 104.

Ammonia dosing module 104 calculates an amount of ammonia needed in substrate 51 based on the predicted amount of ammonia consumed and the consumed ammonia correction factor. Ammonia dosing module 104 signals ammonia dosing system 56 to dispense ammonia into SCR device 32 to maintain NOx conversion at desired parameters. Control module 64 also includes a NOx conversion efficiency model module 110 that calculates NOx conversion efficiency. NOx conversion efficiency model module 110 ensures that NOx conversion in SCR device 32 is within desired limits.

Turning to FIG. 3, and with continued reference to FIGS. 1 and 2, a flowchart illustrates a method 200 of monitoring SCR device 32. Method 200 starts in block 204 and engine out NOx monitoring module 90 of FIG. 2 begins determining an amount of NOx entering SCR device 32 in block 206. NOx monitoring module 90 may directly measure NOx entering SCR device 32 using one or more engine out NOx sensors (not shown) or may employ an engine out NOx model to determine the amount of NOx entering SCR device 32. NOx entering SCR device 32 represents an amount of NOx entrained within exhaust gases 15 passing from an IC engine 12. SCR out NOx monitoring module 94 of FIG. 2 calculates an amount of NOx entrained within exhaust gas 15 passing from the SCR device 32 is determined in block 208. NOx storage model module 96 of FIG. 2 determines an amount of NOx stored in substrate 51 of FIG. 1 in block 210. Predicted consumed ammonia model module 98 of FIG. 2 calculates a predicted amount of consumed ammonia in substrate 51 of FIG. 1 based on the amount of NOx entering SCR device 32 and the amount of NOx exiting SCR device 32 in block 212. In block 214, consumed ammonia correction model module 100 of FIG. 2 determines an ammonia consumed correction factor based on, for example, how long IC engine 12 was operating at low speed and/or idle as sensed by tachometer 76 of FIG. 1. Ammonia dosing module 104 calculates an amount of ammonia needed to replenish substrate 51 of FIG. 1 and signals ammonia dosing system 56 of FIG. 1 to dispense ammonia in block 216. At block 218 method 200 ends.

At this point it should be understood that the exemplary embodiments provide a system for monitoring SCR device operation to adjust for ammonia consumed during periods of low speed operation and/or idle. It has been found that during periods of low temperature operation, such as during low speed operation and/or idle, NOx accumulates within the SCR device. The SCR device monitoring system in accordance with the exemplary embodiment, determines an ammonia consumed correction factor to account for ammonia consumed by NOx stored or lingering in the SCR device during these periods of low temperature operation. Accordingly, the exemplary embodiment facilitates enhanced NOx conversion efficiency thereby reducing contaminants emitted to ambient.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A selective catalytic reduction (SCR) device monitoring system comprising:
   an SCR device;
   an engine out NOx monitoring module;
   an SCR out NOx monitoring module configured and disposed to monitor NOx released from the SCR device;
   a NOx storage model module operatively connected to the engine out NOx module and the SCR out NOx monitoring module, the NOx storage model module being configured and disposed to determine an amount of NOx stored in the SCR device;
   a consumed ammonia correction model module operatively connected to the NOx storage model module, the consumed ammonia correction model module being configured and disposed to calculate a corrected consumed ammonia prediction factor; and
   an ammonia dosing system configured and disposed to introduce an amount of ammonia into the SCR device based on the corrected consumed ammonia prediction factor.

2. The SCR device monitoring system according to claim 1, further comprising: an ammonia dosing module operatively connected to the consumed ammonia correction model module and the ammonia dosing system, the ammonia dosing module being configured and disposed to calculate an amount of ammonia needed in the SCR device based on a predicted amount of ammonia consumed and the corrected consumed ammonia correction factor.

3. The SCR device monitoring system according to claim 1, further comprising: a NOx conversion efficiency model module including a NOx conversion efficiency model configured and disposed to determine a conversion efficiency of NOx to diatomic nitrogen.

4. An internal combustion (IC) engine comprising:
   an engine including an exhaust gas conduit;
   a selective catalytic reduction (SCR) device fluidically connected to the exhaust gas conduit; and
   an SCR device monitoring system including:
      an engine out NOx monitoring module;
      an SCR out NOx monitoring module configured and disposed to monitor NOx released from the SCR device;
      a NOx storage model module operatively connected to the engine out NOx monitoring module and the SCR out NOx monitoring module, the NOx storage model module being configured and disposed to determine an amount of NOx stored in the SCR device;
      a consumed ammonia correction model module operatively connected to the NOx storage model module, the consumed ammonia correction model module being configured and disposed to calculate a corrected consumed ammonia correction factor; and
      an ammonia dosing system configured and disposed to introduce an amount of ammonia into the SCR device based on the corrected consumed ammonia correction factor.

5. The SCR device monitoring system according to claim 4, further comprising: an ammonia dosing module operatively connected to the consumed ammonia correction model module, the ammonia dosing module being configured and disposed to calculate an amount of ammonia needed in the SCR device based on a predicted amount of ammonia consumed and the corrected consumed ammonia correction factor.

6. The SCR device monitoring system according to claim 5, further comprising: an ammonia dosing system operatively connected to the ammonia dosing module.

7. The SCR device monitoring system according to claim 4, further comprising: a NOx conversion efficiency model module including a NOx conversion efficiency model configured and disposed to determine a conversion efficiency of NOx to diatomic nitrogen.

8. A method of monitoring a selective catalytic reduction (SCR) device comprising:
   calculating an amount of NOx entrained within exhaust gases passing from an internal combustion engine;
   determining an amount of NOx entrained within exhaust gases passing from the SCR device;
   calculating an amount of NOx stored in the SCR device;
   calculating a corrected consumed ammonia correction factor;
   determining a corrected amount of ammonia consumed in the SCR device; and
   introducing an amount of ammonia into the SCR device based on a predicted amount of ammonia consumed and the corrected amount of ammonia consumed.

9. The method of claim 8, further comprising: calculating a NOx conversion efficiency of the SCR device.

* * * * *